United States Patent
Hamilton, II et al.

(10) Patent No.: US 10,042,885 B2
(45) Date of Patent: Aug. 7, 2018

(54) INDEX TABLE BASED ROUTING FOR QUERY RESOURCE OPTIMIZATION

(71) Applicant: International Business Machines Corporation, Armonk, NY (US)

(72) Inventors: Rick A. Hamilton, II, Charlottesville, VA (US); Jeffrey R. Hoy, Gibsonia, PA (US); Brian M. O'Connell, Cary, NC (US); Clifford A. Pickover, Yorktown Heights, NY (US); Keith R. Walker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

(21) Appl. No.: 14/926,997

(22) Filed: Oct. 29, 2015

(65) Prior Publication Data
US 2017/0124148 A1    May 4, 2017

(51) Int. Cl.
G06F 17/30 (2006.01)
G06F 1/32 (2006.01)

(52) U.S. Cl.
CPC ...... *G06F 17/30442* (2013.01); *G06F 1/3234* (2013.01); *G06F 17/30339* (2013.01); *G06F 17/30507* (2013.01); *G06F 17/30864* (2013.01)

(58) Field of Classification Search
CPC ................................................ G09F 17/30156
USPC ................................. 707/692, 626, 610, 830
See application file for complete search history.

(56) References Cited

U.S. PATENT DOCUMENTS

| | | | |
|---|---|---|---|
| 7,653,826 B1 | 1/2010 | Day et al. | |
| 7,941,426 B2 | 5/2011 | Bestgen et al. | |
| 8,312,050 B2 | 11/2012 | Draese | |
| 8,515,927 B2 | 8/2013 | Bailey, Jr. et al. | |
| 2010/0161554 A1* | 6/2010 | Datuashvili | ....... G06F 17/30156 707/610 |

(Continued)

OTHER PUBLICATIONS

Internet Society Requests for Comment (RFCs) et al., "Home Agent-Assisted Route Optimization between Mobile IPv4 Networks (RFC6521)", An IP.com Prior Art Database Technical Disclosure, Original Publication Date: Feb. 1, 2012, IP.com No. 000215473, IP.com Electronic Publication: Mar. 1, 2012, Copyright (c) 2012 IETF Trust and the persons identified as the, pp. 1-107, <http://ip.com/IPCOM/000215473>.

(Continued)

*Primary Examiner* — Baoquoc N To
(74) *Attorney, Agent, or Firm* — Kevin Michael Jordan

(57) ABSTRACT

Embodiments of the present invention disclose optimizing resources of distributed database replicas in which one or more processors receive resource information associated with a plurality of database replicas hosted on a plurality of servers, the resource information includes identification of indexes of database tables of each database replica. The instances of indexes residing in memory of the plurality of servers is determined, based on the state of each index, which indicates whether the index resides in memory. The instances of indexes that reside in memory and are redundant among the plurality of database replicas are determined, and in response to receiving a query directed to a database replica, if an index of a database table having the query-requested data resides in memory, the query is routed to the database replica on which the index resides in memory.

17 Claims, 5 Drawing Sheets

(56) References Cited

U.S. PATENT DOCUMENTS

2011/0196882 A1   8/2011   Kesselman
2012/0330964 A1   12/2012  Baude et al.
2013/0231790 A1   9/2013   Shao
2013/0332484 A1   12/2013  Gajic

OTHER PUBLICATIONS

Mittal, Sparsh, "A Technique for Write-endurance aware Management of Resistive RAM Last Level Caches", Submitted on Oct. 31, 2013 (v1), last revised Apr. 30, 2014 (this version, v2), 1 page, <http://arxiv.org/abs/1311.0041>.

* cited by examiner

INDEX TABLE BASED ROUTING FOR QUERY RESOURCE OPTIMIZATION

FIELD OF THE INVENTION

The present invention relates generally to the field of database queries, and more particularly to power and resource considerations in query optimization.

BACKGROUND OF THE INVENTION

Relational databases include one or more tables, organized by columns and rows, in which the table includes data of an entity type, columns of the table represent a particular attribute of the entity type, and rows include records of the attributes for the entity type. The preponderance of focus on database applications and engines addresses improvement of performance of returning results of queries. To improve the performance of response to data queries, databases may create an index of a table, based on at least one data column of the table, and includes a memory location reference to the table row associated with the content of a particular indexed column entry. An index often uses a sorted binary tree to organize the column data, enabling a faster search in response to some queries, avoiding a search through all the entries of one or more database tables.

In some cases, database management applications dynamically modify indexes according to conditions associated with database queries; however, these activities are also associated with optimizations to improve query response performance. For example, in some situations, it is uncommon for resource requirements to be equally considered in optimization of database queries, as the focus of most optimizations are on the time performance of providing results to queries.

SUMMARY

Embodiments of the present invention disclose a method, computer program product, and system for optimizing resources of distributed database replicas. The method for optimizing resources of distributed database replicas provides that one or more processors receive resource information associated with a plurality of database replicas hosted on a plurality of servers, the resource information including identification of indexes of database tables of each database replica. The one or more processors determine whether at least one instance of indexes reside in memory of the plurality of servers, based on the state of each index, wherein the state of an index indicates whether the index resides in memory. Responsive to determining that at least one instance of the indexes of the database tables resides in memory, one or more processors determine whether the at least one instance of indexes that reside in memory are redundant among the plurality of database replicas, and in response to receiving a query that is directed to at least one of the plurality of database replicas, one or more processors determine whether the query is directed to data for which an index exists that resides in memory, and if so, route the query to the database replica on which the index resides in memory.

DETAILED DESCRIPTION

Embodiments of the present invention provide a method, computer program product, and computer system for optimizing the consumption of resources associated with replicated database systems using indexes of database tables, by routing queries to an optimal database replica.

Embodiments of the present invention recognize that the use of database table indexes to perform queries offers improved performance; however, for replicated databases in which there are multiple instances of the database, often distributed across a network and residing on multiple storage devices, multiple copies of table indexes may exist. In some cases, a relational database management system (RDBMS) may load database table indexes in the system memory of its storage device host to improve performance. For example, one or more indexes of tables of a database replica are loaded into the memory of the database server hosting the database replica. In many cases, the system memory of database servers hosting database replicas may not have adequate memory capacity to hold all or most indexes of database tables in memory, thus retrieving index information requires accessing disk storage. In addition to degrading performance of query response, accessing disk storage instead of reading index information from memory consumes more power.

Efforts to optimize query response performance often omit consideration of power requirements (energy consumption) and utilization of resources supporting the replicated and often distributed database system. Applications and database management systems that dynamically create or modify indexes according to usage or dynamically modify a query to better align with the conditions of existing indexes, are optimized for performance, not optimal resource utilization or power consumption. The structure that emerges has certain predictable characteristics because indexes take up disk space and memory, in addition to the underlying table they index. Database engines try to load indexes in memory for better performance, but this is not possible when the amount of data exceeds available memory. Therefore, when a query is sent to the database, it must access disk storage to return the results, which gives a performance and power penalty compared to accessing indexes stored in memory.

Embodiments of the present invention provide techniques to optimize the use and consumption of resources associated with distributed databases that are replicated and utilize database table indexing to enable the routing of queries to the optimal database replica. In some embodiments of the present invention, some or all duplicate indexes, residing on multiple servers hosting database replicas, are removed from system memory enabling additional, distributed, unique instances of database table indexes to reside in system memory, thus query performance is supported while power consumption is reduced, and memory utilization is improved.

Figure 1:
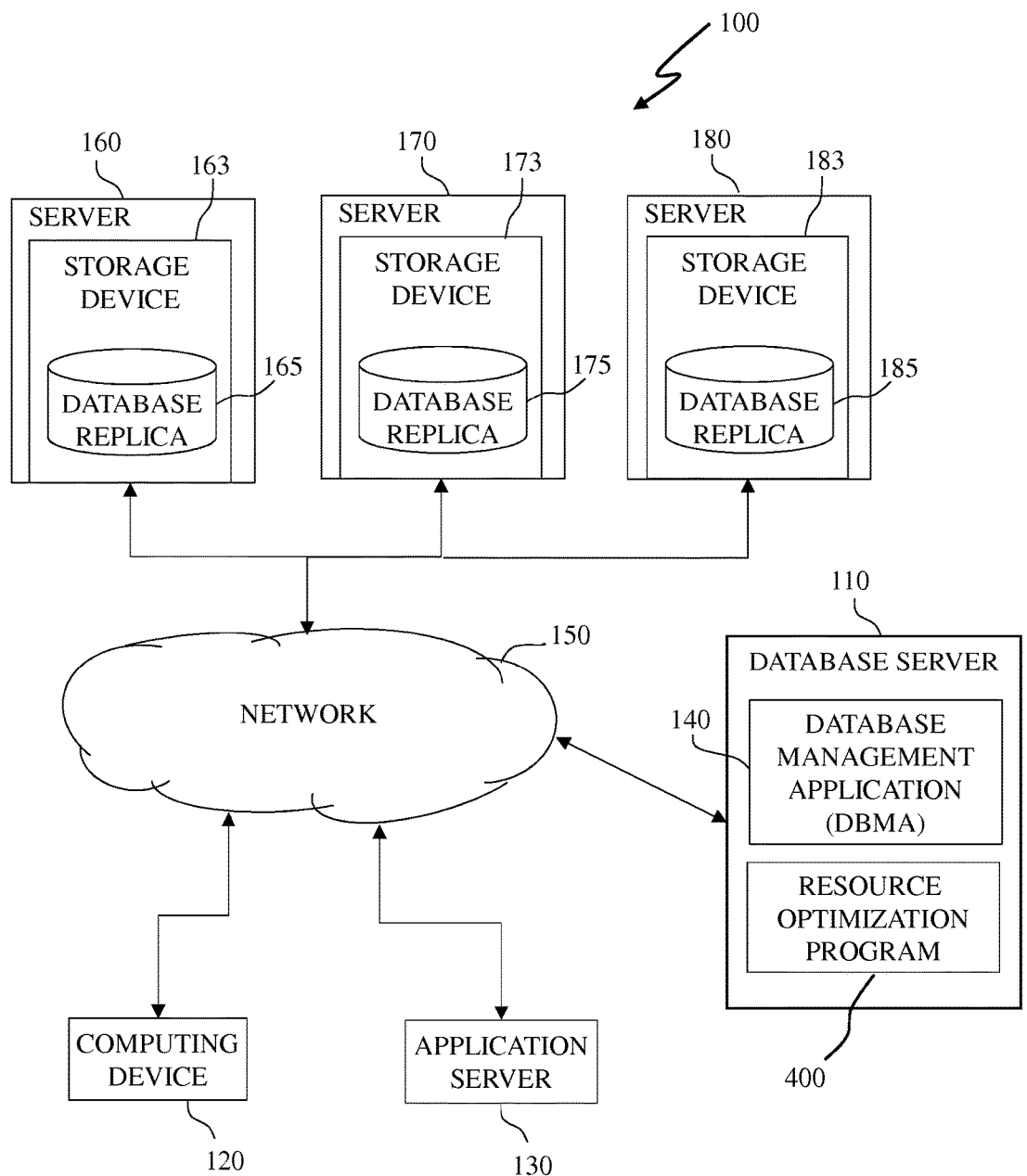
FIG. 1 is a functional block diagram illustrating a distributed database replication environment, in accordance with an embodiment of the present invention.

The present invention will now be described in detail with reference to the Figures. FIG. 1 is a functional block diagram illustrating distributed database replication environment 100, in accordance with an embodiment of the present invention. Distributed database replication environment 100 includes database server 110, shown hosting resource optimization program 400 and database management application 140, computing device 120, application server 130, servers 160, 170, and 180, shown hosting storage devices 163, 173, 183, which include database replicas 165, 175, and 185, respectively, all interconnected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between database server 110, computing device 120, application server 130, and servers 160, 170, and 180, database management application 140, and resource optimization program 400, in accordance with embodiments of the present invention.

Servers 160, 170, and 180 are depicted as hosting storage devices 163, 173, and 183, respectively. In some embodiments of the present invention, each or any of servers 160, 170, and 180 may be a web server, a blade server, or a rack-mounted server. In other embodiments, servers 160, 170, and 180 may be a mobile computing device, or any other electronic device or computing system capable of receiving and sending data. In other embodiments, servers 160, 170, and 180 may represent a virtual computing device of a computing system utilizing multiple computers as a server system, such as in a cloud computing environment. In still other embodiments, each or any of servers 160, 170, and 180 may be a laptop computer, a tablet computer, a netbook computer, a personal computer (PC), a desktop computer, a personal digital assistant (PDA), a smart phone, or any programmable electronic device capable of receiving and performing program instructions. In yet other embodiments, each or any of servers 160, 170, and 180 may represent a computing system utilizing clustered computers and components (e.g., database server computers, etc.) that act as a single pool of seamless resources when accessed within distributed database replication environment 100. Servers 160, 170, and 180 may include internal and external hardware components, as depicted and described with reference to FIG. 5.

Storage devices 163, 173, and 183 are data storage devices hosting database replicas 165, 175, and 185, respectively. In some embodiments of the present invention, storage devices 163, 173, and 183 are components of distributed computing devices or systems, for example, servers on a network (not shown). Each or any of storage devices 163, 173, and 183 may be, but are not limited to, magnetic hard disk drives (HDD), solid state drives (SSD), universal serial bus (USB) connected flash drives, or flash drives (i.e. SD card). Energy, or power consumption varies by the type of storage device on which database replicas 165, 175, and 185 reside, and embodiments of the present invention include determining which index to place in memory on a particular storage device, such that the resources of the hosting system, such as the memory capacity, and power consumption of a server hosting one of database replicas 165, 175, and 185, are optimized, while maintaining an acceptable level of performance.

Servers 160, 170, and 180, on which storage devices 163, 173, and 183 reside may be connected to a local area network (LAN), a wide area network (WAN), such as the Internet, or a combination of one or more LANs and WANs. In some embodiments, storage devices 163, 173, and 183 receive input and instructions from database management application 140 running on database server 110 and/or resource optimization program 400, and provide information and responses to queries to database server 110.

Database replicas 165, 175, and 185 are copies of a distributed database, and in some embodiments of the present invention, database replicas 165, 175, and 185 each reside on separate storage devices, such as storage devices 163, 173, and 183 respectively, which are connected to or hosted on servers 160, 170, and 180, connected to network 150. In other embodiments, some combination of database replicas 165, 175, and 185 may be connected to or hosted on the same storage device and/or server. For example, database replicas 165 and 175 may both be hosted on server 160 in storage device 163 (not shown). In another embodiment, storage devices 163 and 173 that include database replicas 165 and 175 respectively are both hosted on server 160 (not shown).

The data and organizational structure of database replicas 165, 175, and 185 are consistent, maintained on a predefined interval by DBMA 140. To improve performance, DBMA 140 may generate indexes of some or all tables included in each of database replicas 165, 175, and 185, resulting in duplicate, redundant indexes. Some indexes may reside in memory and are quickly accessed; enhancing the performance of processing queries, and requiring less power consumption to complete the transaction, since reading from memory consumes less power (electricity) than reading data from a hard disk drive (HDD) rotating at high speed.

Computing device 120 is a user device from which a user may access database server 110 and submit a query that is routed to one of database replicas 165, 175, or 185, hosted on storage devices 163, 173 and 183, respectively. In some embodiments, computing device 120 may be a mobile computing device, a laptop computer, a tablet computer, a netbook computer, a personal computer (PC), a desktop computer, a personal digital assistant (PDA), a smart phone, or any programmable electronic device capable of performing the operational steps of resource optimization program 400. In another embodiment, computing device 120 represents a computing system utilizing clustered computers and components (e.g., database server computers, application server computers, etc.) that act as a single pool of seamless resources when accessed within distributed database replication environment 100. In other embodiments, computing device 120 may represent a virtual computing device of a computing system utilizing multiple computers as a server system, such as in a cloud computing environment. Computing device 120 may include internal and external hardware components, as depicted and described with reference to FIG. 5.

Application server 130 is a computing device performing operational steps of one or more application that submit queries to database server 110 regarding data included in database replicas 165, 175, and 185. Application server 130 receives query results from database server 110. In some embodiments of the present invention, application server 130 may be a web server, a blade server, or a rack-mounted server. In other embodiments, application server 130 is a mobile computing device, or any other electronic device or computing system capable of receiving and sending data. In other embodiments, application server 130 may represent a virtual computing device of a computing system utilizing multiple computers as a server system, such as in a cloud computing environment. In still other embodiments, application server 130 may be a laptop computer, a tablet computer, a netbook computer, a personal computer (PC), a desktop computer, a personal digital assistant (PDA), a smart phone, or any programmable electronic device capable of receiving and performing program instructions. In yet other embodiments, application server 130 represents a computing system utilizing clustered computers and components (e.g., database server computers, etc.) that act as a single pool of seamless resources when accessed within distributed database replication environment 100. Application server 130 may include internal and external hardware components, as depicted and described with reference to FIG. 5.

Database server 110 is a computing device hosting database management application (DBMA) 140, and resource optimization program 400. In some embodiments of the present invention, database server 110 operates resource optimization program 400 and may host resource optimization program 400 as depicted in FIG. 1. In other embodiments, database server 110 accesses resource optimization program 400 remotely via network 150.

In some embodiments, database server 110 may be a management server, a web server, a mobile computing device, or any other electronic device or computing system capable of receiving and sending data. In other embodiments, database server 110 may represent a virtual computing device of a computing system utilizing multiple computers as a server system, such as in a cloud computing environment. In still other embodiments, database server 110 may be a laptop computer, a tablet computer, a netbook computer, a personal computer (PC), a desktop computer, a personal digital assistant (PDA), a smart phone, or any programmable electronic device capable of performing the operational steps of resource optimization program 400. In yet other embodiments, database server 110 represents a computing system utilizing clustered computers and components (e.g., database server computers, application server computers, etc.) that act as a single pool of seamless resources when accessed within distributed database replication environment 100. Database server 110 may include internal and external hardware components, as depicted and described with reference to FIG. 5.

Database management application (DBMA) 140 is a collection of programs that enable the organization, storage, retrieval, update, and deletion of data from database replicas 165, 175, and 185. DBMA 140 serves as an interface between database replicas 165, 175, and 185, and end users or application programs, ensuring that data replicated into multiple instances of database are consistent, in content, organization and accessibility. The DBMA manages three important things: the data, the database engine that allows data to be accessed, locked and modified, and the database schema, which defines the logical structure of the database and its replicas.

Resource optimization program 400 operates to optimize the utilization of resources of servers 160, 170, and 180, hosting database replicas 165, 175, and 185, on storage devices 163, 173, and 183, respectively. Resource optimization program 400 receives information from database replicas 165, 175, and 185 that includes the identification of indexes for each of database replicas 165, 175, and 185, and information as to whether an index is held in memory on the hosting server, or if the index is stored on disk. In generating database replicas 165, 175, and 185, duplicate indexes may be generated as well. For example, index A, index B, and index C correspond to tables A, B, and C, respectively, and copies of each index are included in database replicas 165, 175, and 185, and for each replica, index A and index B are in memory, and for database replica 185, index C is also in memory. Having multiple redundant instances of index tables in memory may be poor utilization of system memory and unnecessarily consume additional power to support redundant indexes in memory and maintain updates. In some embodiments of the present invention, resource optimization program 400 identifies duplicate or redundant indexes, based on resource information received from a plurality of servers hosting database replicas, and in response to receiving input to optimize resources of the distributed database replicas, resource optimization program 400 removes some or all of the redundant instances of indexes, while leaving at least one instance remaining in memory of a server supporting a database replica. Queries directed to data corresponding to a particular table of the database are routed to the database replica which has the index associated with the particular table, in memory. Removing redundant instances of indexes from memory, frees up memory resources, which may be used to accommodate additional unique instance of database table indexes in memory, or may be used to accommodate data that is requested at high frequency, both of which contribute to improving database operational performance. In addition, routing queries to instances of indexes in memory reduces power consumption associated with accessing and reading index information or directly scanning tables from disk.

In some embodiments of the present invention, resource optimization program 400 may preferentially route queries to a database replica hosted on a server that has a lower level of resource requirements than other servers hosting replicas of the database, given an acceptable level of performance is maintained. For example, server A, hosting database replica A, may be projected to consume 75% of the non-transactional power that server B, hosting database replica B, may consume, based on information received from server A and server B. The information received from servers A and B may also indicate that server A has an average transaction power consumption that is less than that of server B. Routing query requests to server A, when available, will consume less power than if the query was routed to server B. Additionally, a server that includes a database replica stored on an SSD storage device may have data retrieval transactions that are faster and consume less power than a server that includes a database replica stored on a HDD storage device. Resource optimization program 400 may preferentially route query requests to server A over server B when possible to reduce consumed power, and in general, resource optimization program 400 routes query requests to the server hosting a database replica having the lowest electrical power consumption, when operating to optimize power consumption.

Figure 2:
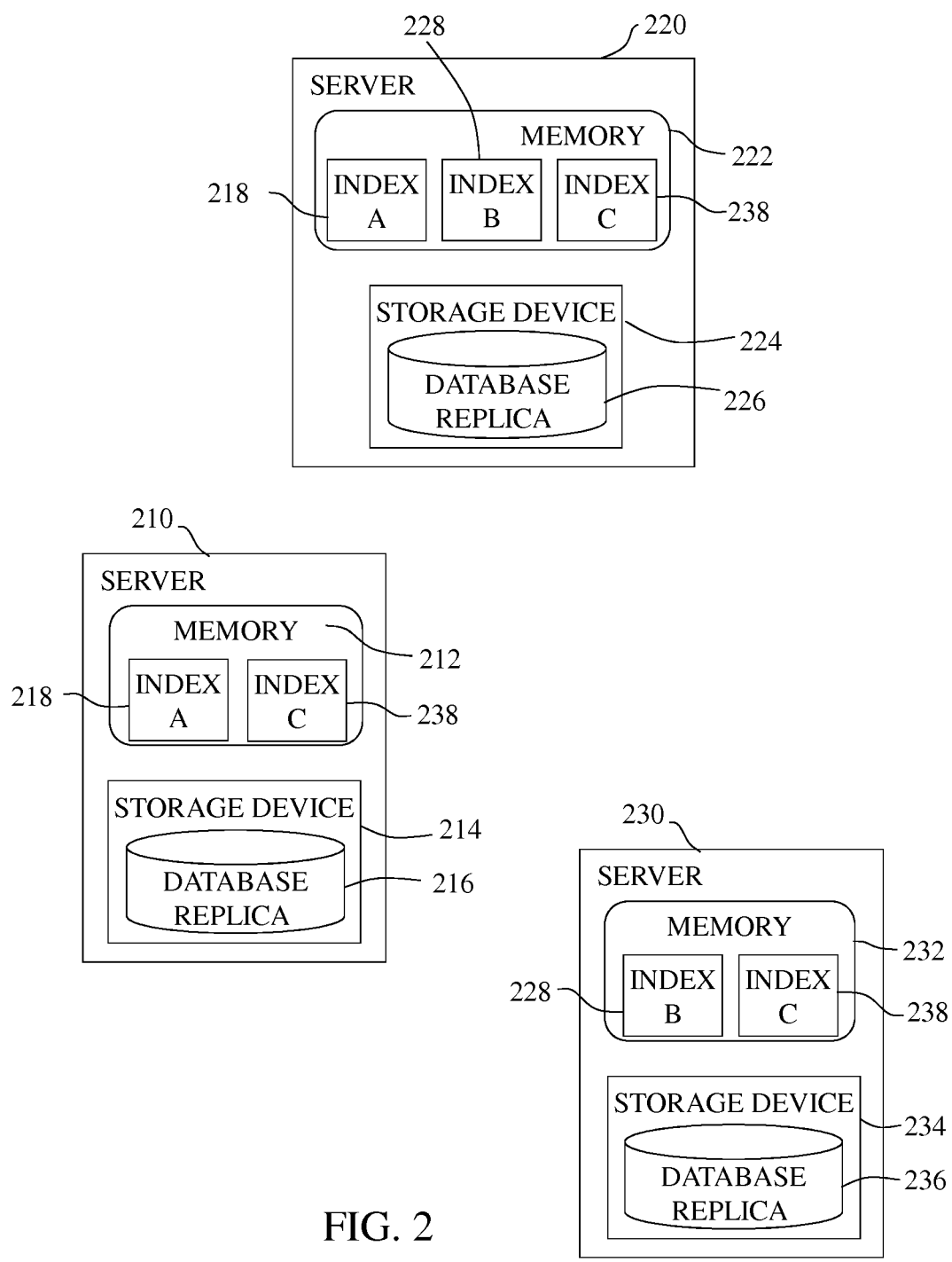
FIG. 2 is a functional block diagram illustrating redundant indexes residing within the memory of multiple servers hosting a database replica, in accordance with an embodiment of the present invention.

FIG. 2 is a functional block diagram illustrating redundant indexes residing within the memory of servers 210, 220, and 230, hosting database replicas 216, 226, and 236, in accordance with an embodiment of the present invention. Server 210 includes storage device 214 that stores database replica 216, and memory 212, which includes index A 218, and index C 238. Server 220 includes storage device 224 that stores database replica 226, and memory 222, which includes index A 218, index B 228, and index C 238. Server 230 includes storage device 234 that stores database replica 236, and memory 232, which includes index B 228 and index C 238. In some embodiments of the present invention, servers 210, 220, and 230 are part of a plurality of servers each hosting a replica of the database, such as database replica 216, stored in a storage device residing in or connected to the hosting server. Index A 218, index B 228, and index C 238 are indexes of tables that are part of the organizational structure of database replicas 216, 226, and 236. Index A 218 corresponds to table A, index B 228 corresponds to table B, and index C 238 corresponds to table C, of database replicas 216, 226, and 236. As illustrated, index A 218, index B 228, and index C 238, are duplicated in memory across servers 210, 220, and 230, resulting in redundant instance of database table indexes that are held in memory of servers hosting database replicas, which consumes extra memory to support the redundancy, and limits the quantity of indexes of database tables that can be simultaneously held in memory of the servers hosting the database replicas.

Figure 3:
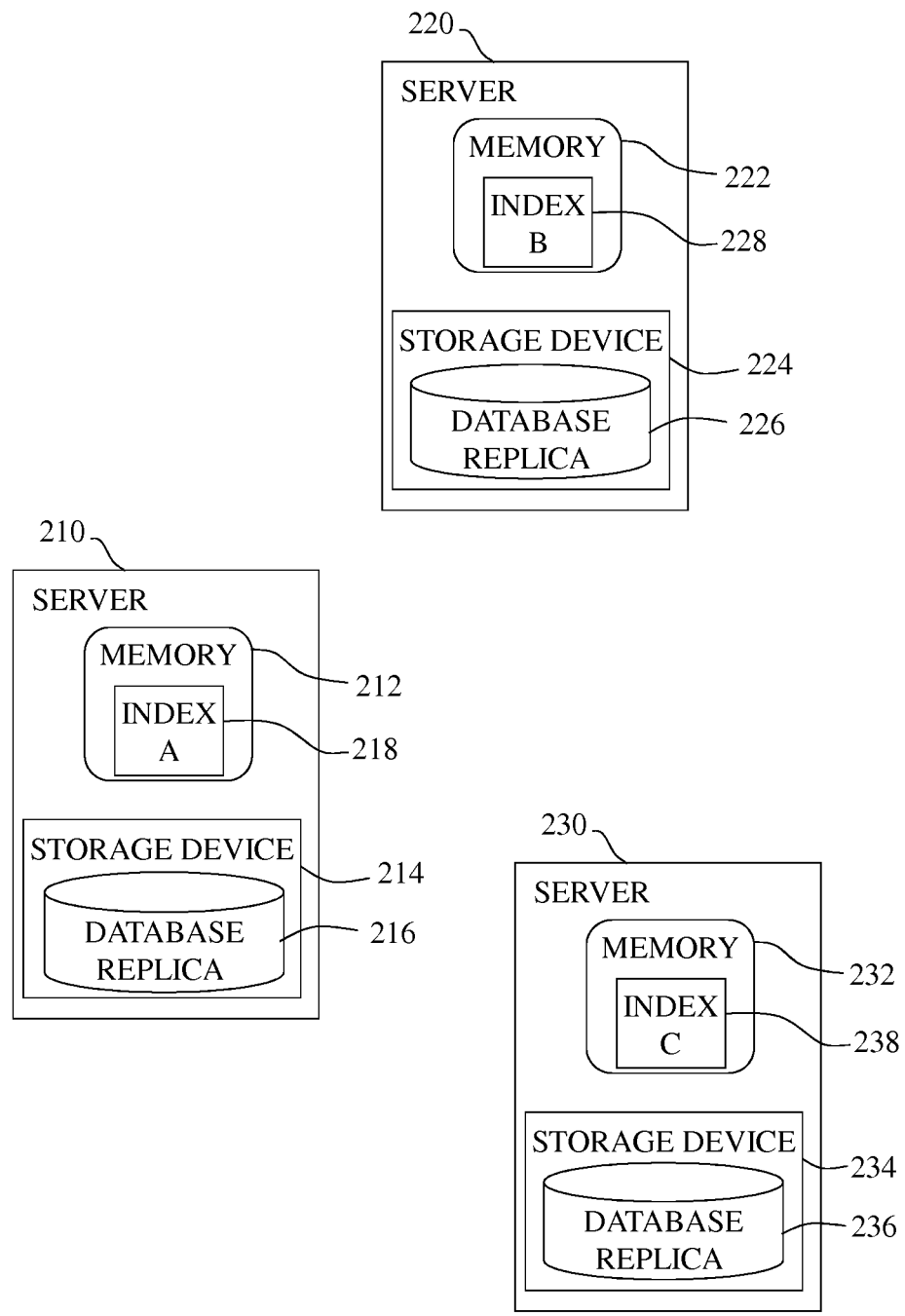
FIG. 3 is a functional block diagram illustrating indexes residing in memory, uniquely distributed among servers hosting a database replica, in accordance with an embodiment of the present invention.

FIG. 3 is a functional block diagram illustrating indexes residing in memory, uniquely distributed among servers 210, 220, and 230, in accordance with an embodiment of the present invention. Server 210 includes storage device 214, which stores database replica 216, and memory 212 in which index A 218 resides. Server 220 includes storage device 224, which stores database replica 226, and memory 222 in which index B 228 resides. Server 230 includes storage device 234, which stores database replica 236, and memory 232 in which index C 238 resides. Embodiments of the present invention receive information from each server hosting a replica of the replicated and distributed database, regarding the indexes included with the database replica and the indexes that reside in memory of the server hosting the database replica. In response to receiving input to optimize the resources utilized and consumed by the servers hosting the distributed database replicas, some or all duplicate indexes may be removed from memory such that instances of indexes residing in memory are optimized to reduce consumption of resources. In some embodiments, redundant instances of indexes stored on storage disks across multiple servers hosting database replicas may be removed, after a copy of instructions to generate the indexes are saved to a file accessible by the database management application, such as DBMA 140.

For example, in response to receiving input to optimize memory resources utilized across database replicas 216, 226, and 236, redundant copies of database table indexes may be removed from memory, leaving a single instance of each table index residing in memory of the servers hosing the database replicas. The example may result in server 210 having a copy of index A 218 residing in memory 212, server 220 having a copy of index B 228 residing in memory 222, and server 230 having a copy of index C 238 residing in memory 232.

In some embodiments of the present invention, redundant copies of indexes are removed from memory and disk storage to maximize the utilization of memory and storage resources; however, prior to removal, a file that includes instructions to create the index is generated and stored, so that in the event of access loss of a unique index hosted in the memory of a server, the index may be regenerated. In other embodiments of the present invention, some minimal level of redundant indexes may be permitted to address a need for attaining an acceptable level of data retrieval performance. In some embodiments of the present invention, information received from the servers hosting database replicas may include information about the memory state, storage state, and power consumption of the steady state and average transaction processing of the hosting servers and their components. The information may also include the types of server and disk storage associated with a database replica, which may imply a reduced power consumption or improved retrieval performance (i.e. SSD vs. HDD). In some embodiments of the present invention, in addition to considering the servers on which a database table index resides in memory, the information received from the servers hosting database replicas may be used to project which replicas consume a lower, or least amount of power in processing queries.

Figure 4:
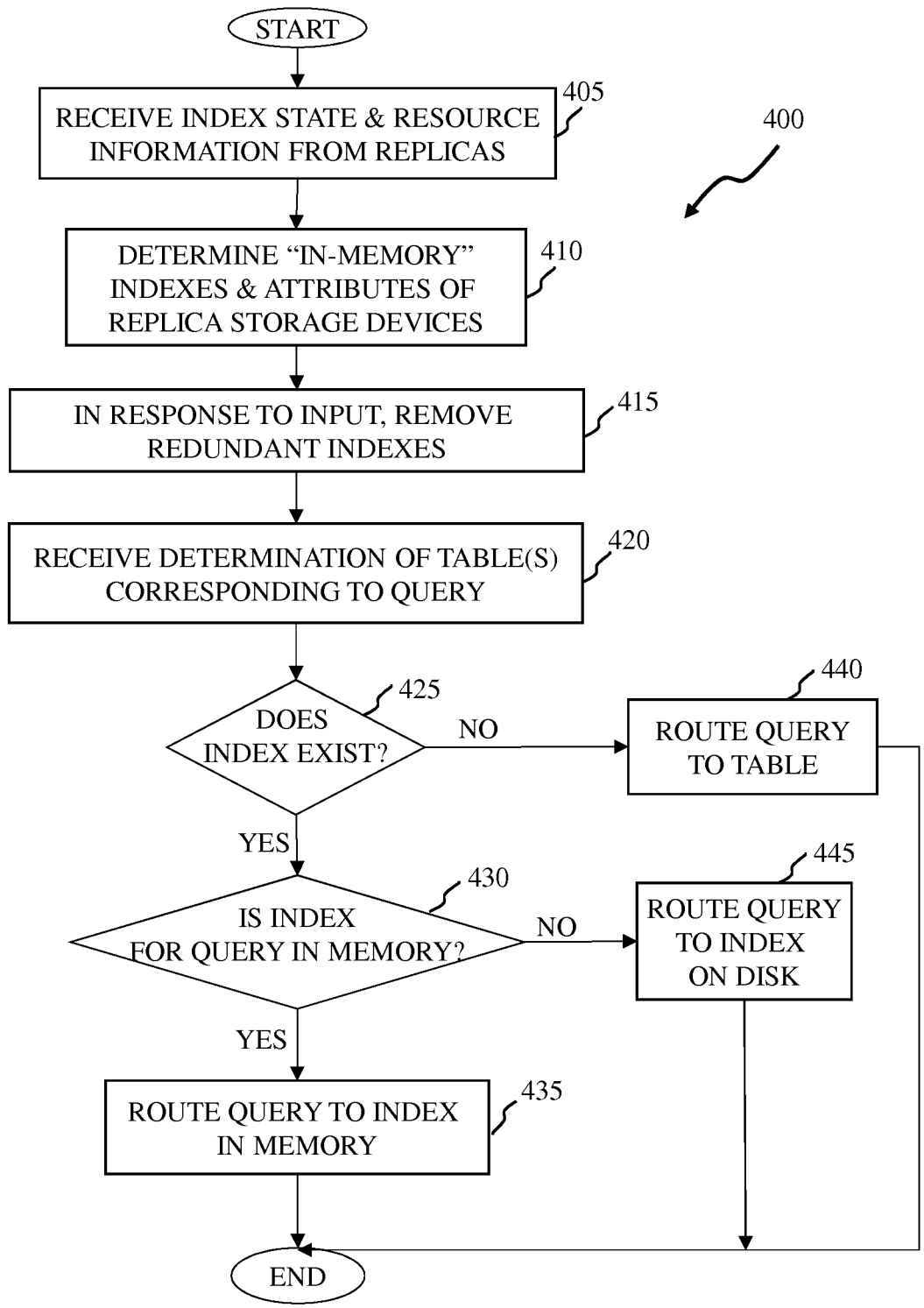
FIG. 4 illustrates operational steps of a resource optimization program, inserted on a database server within the distributed database replication environment of FIG. 1, in accordance with an embodiment of the present invention.

FIG. 4 illustrates operational steps of resource optimization program 400, inserted on database server 110 within distributed database replication environment 100 of FIG. 1, in accordance with an embodiment of the present invention. In some embodiments of the present invention, resource optimization program 400 operates in conjunction with one or more database management applications, such as DBMA 140, as an integrated component of a database management system. In other embodiments, resource optimization program 400 is called by application components of a database management system to perform optimization activities. Embodiments of the present invention perform optimization activities directed to the use and utilization of resources supporting a plurality of database replicas of a database.

In step 405 resource optimization program 400 receives index state and resource information from servers hosting replicas of the database. The index state information includes the instances of each index on servers hosting database replicas, as well as whether the index resides in memory, on disk, or both. In some embodiments of the present invention, additional resource information received from servers hosting database replicas includes, but is not limited to, available server memory and server memory utilization, disk storage details including the type of disk and available capacity, disk transaction speed, disk transaction power consumption, and server power consumption information including steady state and transaction power consumption, if available.

In some embodiments of the present invention, resource optimization program 400 accesses information from servers hosting database replicas, performing a "pull" of the information. In other embodiments, the servers hosting database replicas collect and send the information to resource optimization program 400, performing a "push" of information to resource optimization program 400, which receives and processes the information. In other embodiments, the information may be received by resource optimization program 400 by a combination of "push" and "pull" activities. The information may be sent or accessed at a regularly scheduled frequency, or upon a state change to previously sent or accessed information.

For example, resource optimization program 400, operating on database server 110, in conjunction with database management application 140, requests and receives information from servers 160, 170, and 180, regarding the state of indexes for each server, power consumption of each server (steady state and transactional), and information associated with the power consumption and access time of storage devices 163, 173, and 183 corresponding to database replicas 165, 175, and 185, respectively (FIG. 1).

In step 410, resource optimization program 400 determines the in-memory indexes and attributes of replica storage devices. The received information is analyzed by resource optimization program 400 to determine which indexes are associated with which servers and storage devices. The information is further analyzed to determine the indexes that reside in memory, on disk, or both. In addition, information associated with attributes of the servers and storage devices hosting the database replicas, may be analyzed to determine and rank the servers, for example, by their respective power consumption, available storage capacity, routing requirements, and other resource related information associated with the individual servers and their corresponding storage devices.

For example, resource optimization program 400 determines from the received information corresponding to the memory and attributes of servers 210, 220, and 230 (FIG. 2) that index A 218 resides in-memory on servers 210 and 220, index B 228 resides in-memory on servers 220 and 230, and index C 238 resides in-memory on servers 210, 220, and 230. In addition, resource optimization program 400 may receive information regarding the power consumption for steady-state and transactional activity for servers 210, 220, and 230, as well as that of storage devices 214, 224, and 234. Information regarding the capacity and available memory of servers 210, 220, and 230, in memories 212, 222, and 232, respectively, may also be received by resource optimization program 400. The information is used to determine the most optimal routing of queries such that resources supporting the database replicas are optimized.

In step 415, in response to receiving input, resource optimization program 400 removes redundant indexes. Resource optimization program 400 responds to input for an optimization of resources supporting the database replicas by performing optimization activities, which include, but are not limited to removing redundant indexes and limiting instances of database table indexes in memory among the servers hosting database replicas. In some embodiments of the present invention, resource optimization program 400 instructs database engines on servers supporting database replicas which indexed tables do not need to be loaded in memory due to the index residing in memory on another database replica server. In some embodiments of the present invention, input for optimization may be received from user input, application input, an environmental or other regulatory broadcast input, or a settings profile associated with a database management system. In other embodiments, resource optimization program 400 may be responsive to determining a limit of redundant indexes has been exceeded, or a minimum amount of available memory is not available due to redundant indexes held in memory.

For example, having received information regarding the indexes that reside in-memory for servers 210, 220, and 230 that support database replicas 216, 226, and 236, (FIG. 2), resource optimization program 400 removes redundant index C 238 from memory 212 of server 210, and removes index A 218 and index C 238 from the memory of server 220, and removes index B 228 from the memory of server 230, resulting in one instance of each particular index residing in memory. In the example the single instance of each index is distributed among servers supporting the database replicas. In some embodiments, resource optimization program 400 may remove redundant instances of table indexes from disk storage as well, saving instructions to regenerate the index, if needed, in a stored file accessible by resource optimization program 400.

In step 420, a query is submitted to a database management system application, such as DBMA 140, and resource optimization program 400 receives a determination of one or more tables associated with the received query. DBMA 140, associated with the database replicas, receives the query and determines the table or tables that include data corresponding to the query. The table information is received by resource optimization program 400 to determine the routing for the query to optimize resource utilization or consumption, and in some embodiments, may include maintaining a level of data retrieval performance.

In decision step 425, resource optimization program 400 determines whether an index exists, which corresponds to the table that includes query-related data. Resource optimization program 400 references the information received from servers supporting database replicas and determines if an index corresponding to the table or tables that include query-related data exists. For the case in which resource optimization program 400 determines that an index corresponding to the identified table of data associated with the query does not exist (step 425, "NO" branch), resource optimization program 400 routes the query to the table(s) to complete the data search and retrieval in step 440. In some embodiments of the present invention, the query is applied to the table, and a search is performed against the table(s) to locate data satisfying the query, consuming additional performance time and power consumption in reading data. In other embodiments, resource optimization program 400 may notify DBMA 140 (FIG. 1) to generate an index for the table(s) associated with the data being queried (not shown), such as a case in which a transaction log indicates the same query is frequently submitted.

For the case in which resource optimization program 400 determines that an index does exist for the table that includes query-related data (step 425, "YES" branch), resource optimization program 400 determines, in decision step 430, whether the index for the table that includes the query-related data resides in memory. For the case in which the index does not reside in memory, (step 430, "NO" branch), resource optimization program 400, in step 445, routes the query to the index on disk, which involves accessing the index on disk, reading the index, and writing the index into memory where it can be accessed to locate precise information of the location of the queried data within the table of the database replica.

For the case in which the index does reside in memory (step 430, "YES" branch), resource optimization program 400, in step 435, routes the query to the database replica on the server having the memory in which the index resides. Routing the query to the index in memory minimizes the power consumption to determine the location of the data to be retrieved for the query. The power consumption savings result from avoiding extensive direct searches of tables to locate the queried data, or avoiding read/write access of disk storage if the index has been saved to disk. In some embodiments of the present invention, the index in memory may be unique among the servers hosting the database replicas corresponding to the table that includes the query-related data, whereas in other embodiments, there may be some level of redundancy of indexes to support maintaining data retrieval performance levels for highly-queried data. When there are redundant indexes, a query may be routed based on other criteria, such as in a round-robin fashion, based on the replica with highest capacity, or based on the replica with lowest number of current pending transactions. Having routed the query to the optimal source for query-data retrieval, resource optimization program 400 ends.

In some embodiments of the present invention, resource optimization program 400 can forecast the need for index changes based on historical daily use, and trends established over longer time periods. Index changes may include loading new indexes into memory made available by removing duplicated (redundant) indexes from memory. Index changes may also include adding some level of redundancy of indexes based on historical demand from queries for data associated with particular database tables. In some embodiments of the present invention resource optimization program 400 may receive within the resource information from the database replicas hosted on a plurality of servers, additional factors, or attributes associated with the storage devices and servers associated with the database replicas. The factors may be considered by resource optimization program 400 individually or in combination to optimize the routing of received queries. Optimization in some embodiments of the present invention includes, but is not limited to one or a combination of factors such as: consideration of retrieval transaction performance, electrical power consumption of a query retrieval transaction, electrical power consumption of a distributed transaction, electrical power consumption of maintaining indexes in memory storage, device type on which a database replica is stored, or security features of the server and storage device on which a database replica is stored.

In receiving the resource information of the database replicas and the storage devices and servers on which the database replicas are hosted, the state of an index indicating "in disk" can be more granularly divided by performance or electric consumption of the disk. For example, if two databases contain a matching index, with one having a current state of in disk on a fast and low power solid state drive (SSD) and the other on a relatively slower mechanical hard disk drive (HDD), the optimization directed system may preferentially route to the database with the index currently in SSD. The same concept can be applied if there are different memory performances or electric consumption factors among the storage devices and/or hosting servers.

Embodiments of the present invention are directed to enable queries of a clustered or replicated database to be routed to the optimal database replica when indexing is utilized among the database replicas. For example, an optimized configuration can include index A of table A on database A, and not include a copy of index A on database B. Upon receiving a query that requires accessing index A of table A, the query can be routed to database A even if queries received previous to optimization activities were directed to database B. If both databases A and B include index A of table A, but index A is currently in memory on database B and in disk on database A, resource optimization program 400 will route the query to database B, which gives better performance and consumes less electrical power.

Some embodiments of the present invention recognize that one of average skill in the art may determine energy consumption (electrical power) cost in a variety of methods and include various considerations. Embodiments of the present invention may utilize cost determinations that are approximated, measured, referenced, or relatively determined. An example is provided:

Energy cost estimate: cost=(storage-specific retrieval cost)×(amount of data retrieved)+transmission cost. The storage-specific retrieval cost may differ by storage type, such as SSD, magnetic disk, mass storage devices, etc., and the retrieval cost may be provided by the device, configured by an administrator, estimated by the system, or calculated by performance testing. The amount of data retrieved is an estimate of the query cost, provided by the database system and taking into account available indices for the query. Transmission cost considers the energy spent retrieving the data remotely, which would be small in a single system but could become a factor in network-based data retrieval. The cost is a function of the networking equipment and the volume of data transferred. In some embodiments, resource optimization program 400 may take into account energy cost of a query as an alternative to performance cost when deciding how to execute the query. Other embodiments may take into account an environmental cost of a replica based on data provided to resource optimization program 400 regarding its power source type, such as if from renewable or non-renewable energy sources, if available.

The system can further analyze the queries and energy costs to identify opportunities to create, destroy and shift index location for more optimal energy usage. For example, for a case in which indexes can be evenly divided between two databases, the memory usage and disk requirements for indexing can be cut in half. Taking the case to further optimization steps, the data could be split between the two databases, equally sharing storage requirements, and eliminating synchronization (at the expense of a level of redundancy to support retrieval performance or fail-over). Energy cost of creating/destroying/moving indices can be evaluated against estimated savings to determine if the change is likely to result in a net savings over the index lifetime.

In some embodiments of the present invention, resource optimization program 400 may consider received information regarding the power consumption of servers and storage devices in addition to, or as an alternative to redundant instances of database table indexes residing in the memory resources of servers supporting the database replicas. Resource optimization program 400 may also consider the type of storage device in routing queries to servers hosting database replicas. Storage devices that include database replicas, which require less power consumption to complete read/write transactions may preferentially receive queries over servers with storage devices that consume greater levels of power, or whose retrieval performance falls below that of other storage devices that include database replicas. For example, servers with solid state storage devices consume less power and provide faster retrieval results over hard disk drive storage devices.

Figure 5:
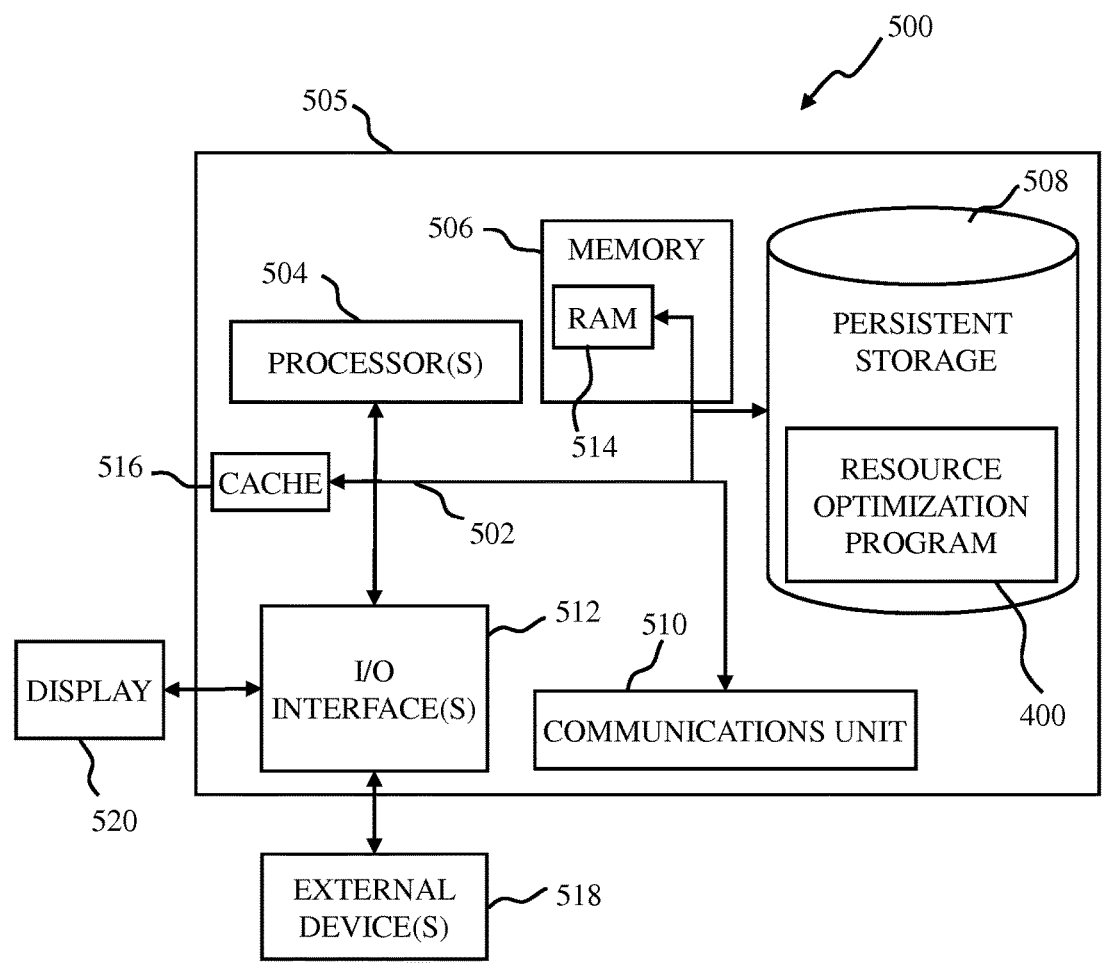
FIG. 5 depicts a block diagram of components of a computer system capable of operationally performing the operational steps of the resource optimization program of FIG. 4, in accordance with an embodiment of the present invention.

FIG. 5 depicts a block diagram of components of computer system 500, including computing device 505, which is similar to database server 110, and capable of operationally performing the operational steps of resource optimization program 400 of FIG. 4, in accordance with an embodiment of the present invention.

Computing device 505 includes components and functional capability similar to computing device 120, application server 130, and servers 110, 160, 170, and 180, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 505 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506, cache memory 516, and persistent storage 508 are computer readable storage media. In this embodiment, memory 506 includes random access memory (RAM) 514. In general, memory 506 can include any suitable volatile or non-volatile computer readable storage media.

Resource optimization program 400 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of distributed database replication environment 100 and computing devices 120 and servers 110, 160, 170, and 180. In these examples, communications unit 510 includes one or more network interface cards. Communications unit 510 may provide communications through the use of either or both physical and wireless communications links. Resource optimization program 400 may be downloaded to persistent storage 508 through communications unit 510.

I/O interface(s) 512 allows for input and output of data with other devices that may be connected to computer system 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., resource optimization program 400 can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor. The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for optimizing resources of distributed database replicas, the method comprising:
receiving, by one or more processors, resource information associated with a plurality of database replicas hosted on a plurality of servers, the resource information including identification of indexes of database tables, a state of each index of the indexes of the database tables for each database replica of the plurality of database replicas, electrical power consumption data of a plurality of storage devices on which is stored the plurality of database replicas, and electrical power consumption data of the plurality of servers hosting the plurality of database replicas on the plurality of storage devices, and the power consumption data of maintaining one or more of the plurality of indexes in memory of the plurality of servers;
determining, by one or more processors, whether at least one instance of the indexes of the database tables reside in memory of the plurality of servers, based on the state of each index of the indexes of the database tables, wherein the state of an index indicates whether the index resides in memory;
responsive to determining at least one instance of the indexes of the database tables resides in memory, determining, by one or more processors, whether the at least one instance of the indexes of the database tables that reside in memory are redundant among the plurality of database replicas; and
in response to receiving a query that is directed to at least one database replica of the plurality of database replicas, determining, by one or more processors, whether the query is directed to data for which an index resides in memory, and if so, routing the query to the at least one database replica of the plurality of database replicas, on which the index resides in memory and is projected to consume a lowest amount of electrical power to process the query.

2. The method of claim 1, further comprising:
receiving, by one or more processors, input to optimize resources of the plurality of database replicas, based on the resource information; and
removing from memory, by one or more processors, the at least one instance of the indexes of the database tables that reside in memory and are redundant among the plurality of database replicas.

3. The method of claim 2, wherein receiving input to optimize resources, further comprises:
saving, by one or more processors, a copy of instructions to generate an instance of each index of the indexes of the database tables that is removed from memory, to a file that is accessible to a database management application of the plurality of database replicas.

4. The method of claim 3, wherein receiving, by one or more processors input to optimize resources, further comprises:
removing from storage disks, by one or more processors, one or more instances of indexes that are redundant among the storage disks of the plurality of database replicas hosted on the plurality of servers.

5. The method of claim 1, wherein receiving, by one or more processors, the resource information associated with the plurality of database replicas hosted on the plurality of servers, further comprises:
receiving resource information associated with a type of storage device of each database replica on each of the plurality of servers; and
routing the query that is directed to at least one of the plurality of database replicas, to a database replica of the plurality of database replicas, based on the type of storage device of the database replica.

6. The method of claim 1, wherein receiving input to optimize resources, further comprises:
routing the query, by one or more processors, to a database replica of the plurality of database replicas hosted on the plurality of servers, based on a combination of factors included within the resource information that is received, wherein the combination of factors includes one or more of: whether there is an index of a corresponding database table residing in memory, relative electrical power consumption of a transaction of the query, or security features, associated with each database replica.

7. A computer program product for optimizing resources of distributed database replicas, the computer program product comprising:
one or more computer readable storage media wherein the computer readable storage medium is not a transitory signal per se, and program instructions stored on the one or more computer readable storage media, the program instructions comprising:
program instructions to receive resource information associated with a plurality of database replicas hosted on a plurality of servers, the resource information including identification of indexes of database tables and a state of each index of the indexes of the database tables for each database replica of the plurality of database replicas, electrical power consumption data of a plurality of storage devices on which is stored the plurality of database replicas, and electrical power consumption data of the plurality of servers hosting the plurality of database replicas on the plurality of storage devices, and the power consumption data of maintaining one or more of the plurality of indexes in memory of the plurality of servers;
program instructions to determine whether at least one instance of the indexes of the database tables reside in memory of the plurality of servers, based on a state of each index of the indexes of the database tables, wherein the state of an index indicates whether the index resides in memory;
responsive to determining at least one instance of the indexes of the database tables resides in memory, program instructions to determine whether the at least one instance of the indexes that reside in memory are redundant among the plurality of database replicas; and
in response to receiving a query that is directed to at least one database replica of the plurality of database replicas, program instructions to determine whether the query is directed to data for which an index resides in memory, and if so, routing the query to the at least one database replica of the plurality of database replicas, on which the index resides in memory and is projected to consume a lowest amount of electrical power to process the query.

8. The computer program product of claim 7, further comprising:
program instructions to receive input to optimize resources of the plurality of database replicas, based on the resource information; and
program instructions to remove from memory the at least one instance of the indexes of the database tables that reside in memory and are redundant among the plurality of database replicas.

9. The computer program product of claim 8, wherein receiving input to optimize resources, further comprises:
program instructions to save a copy of instructions to generate an instance of each index of the indexes of the database tables that is removed from memory, to a file that is accessible to a database management application of the plurality of database replicas.

10. The computer program product of claim 9, wherein program instructions to receive input to optimize resources, further comprises:
program instructions to remove from storage disks, one or more instances of indexes that are redundant among the storage disks of the plurality of database replicas hosted on the plurality of servers.

11. The computer program product of claim 7, wherein program instructions to receive the resource information associated with the plurality of database replicas hosted on the plurality of servers, further comprises:
program instructions to receive resource information associated with a type of storage device of each database replica on each of the plurality of servers; and
program instructions to route the query that is directed to at least one of the plurality of database replicas, to a database replica of the plurality of database replicas, based on the type of storage device of the database replica.

12. The computer program product of claim 7, wherein program instructions to receive input to optimize resources, further comprises:
program instructions to route the query to a database replica of the plurality of database replicas hosted on the plurality of servers, based on a combination of factors included within the resource information that is received, wherein the combination of factors includes one or more of: whether there is an index of a corresponding database table residing in memory, relative electrical power consumption of a transaction of the query, or security features, associated with each database replica.

13. A computer system for optimizing resources of distributed database replicas, the computer system comprising:
one or more computer processors, one or more computer readable storage media, program instructions stored on the computer readable storage media for execution by at least one of the one or more processors, the program instructions comprising:
program instructions to receive resource information associated with a plurality of database replicas hosted on a plurality of servers, the resource information including identification of indexes of database tables, a state of each index of the indexes of the database tables for each database replica of the plurality of database replicas, electrical power consumption data of a plurality of storage devices on which is stored the plurality of database replicas, and electrical power consumption data of the plurality of servers hosting the plurality of database replicas on the plurality of storage devices, and the power consumption data of maintaining one or more of the plurality of indexes in memory of the plurality of servers;
program instructions to determine whether at least one instance of the indexes of the database tables reside in memory of the plurality of servers, based on the state of each index of the indexes of the database tables, wherein the state of an index indicates whether the index resides in memory;
responsive to determining at least one instance of the indexes of the database tables resides in memory, program instructions to determine whether the at least one instance of the indexes of the database tables that reside in memory are redundant among the plurality of database replicas; and
in response to receiving a query that is directed to at least one database replica of the plurality of database replicas, program instructions to determine whether the query is directed to data for which an index resides in memory, and if so, routing the query to the at least one database replica on which the index resides in memory and is projected to consume a lowest amount of electrical power to process the query.

14. The computer system of claim 13, further comprising:
program instructions to receive input to optimize resources of the plurality of database replicas, based on the resource information; and
program instructions to remove from memory, the at least one instance of the indexes of the database tables that reside in memory and are redundant among the plurality of database replicas.

15. The computer system of claim 14, wherein receiving input to optimize resources, further comprises:
program instructions to save a copy of instructions to generate an instance of each index of the indexes of the database tables that is removed from memory, to a file that is accessible to a database management application of the plurality of database replicas.

16. The computer system of claim 13, wherein program instructions to receive the resource information associated with the plurality of database replicas hosted on the plurality of servers, further comprises:
program instructions to receive resource information associated with a type of storage device of each database replica on each of the plurality of servers; and
program instructions to route the query that is directed to at least one of the plurality of database replicas, to a database replica of the plurality of database replicas, based on the type of storage device of the database replica.

17. The computer system of claim 13, wherein program instructions to receive input to optimize resources, further comprises:
program instructions to route the query to a database replica of the plurality of database replicas hosted on the plurality of servers, based on a combination of factors included within the resource information that is received, wherein the combination of factors includes one or more of: whether there is an index of a corresponding database table residing in memory, relative electrical power consumption of a transaction of the query, or security features, associated with each database replica.

* * * * *